Jan. 27, 1959 F. E. PAYNE 2,871,039
SEALING ELEMENT FOR ROTARY MECHANICAL SEALS
Filed Jan. 19, 1955 3 Sheets-Sheet 1

INVENTOR:
FRANK E. PAYNE
BY
Edward R. Lounder

Jan. 27, 1959 F. E. PAYNE 2,871,039
SEALING ELEMENT FOR ROTARY MECHANICAL SEALS
Filed Jan. 19, 1955 3 Sheets-Sheet 2
FIG. 3
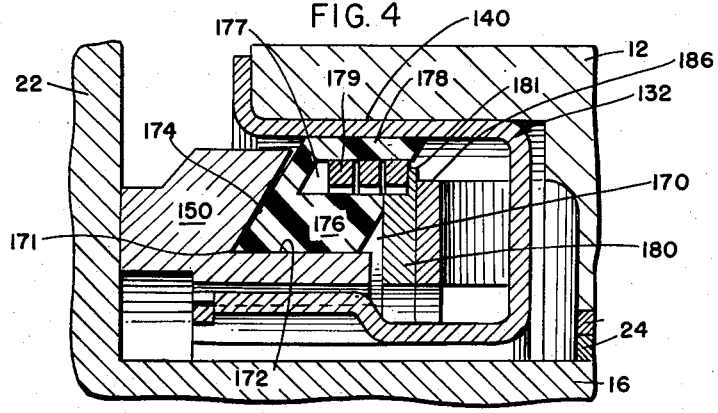
FIG. 4
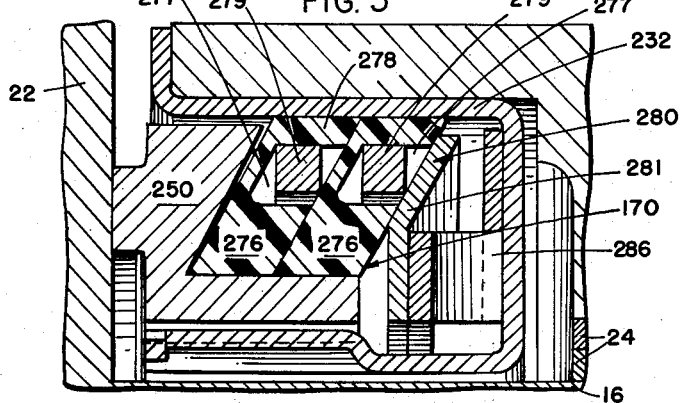
FIG. 5
FIG. 6
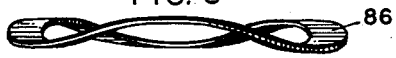
INVENTOR:
FRANK E. PAYNE
BY
Edward R. Sounder Jan. 27, 1959  F. E. PAYNE  2,871,039
SEALING ELEMENT FOR ROTARY MECHANICAL SEALS
Filed Jan. 19, 1955  3 Sheets-Sheet 3

INVENTOR:
FRANK E. PAYNE
BY
Edward R. Lowndes

United States Patent Office 2,871,039
Patented Jan. 27, 1959

2,871,039

SEALING ELEMENT FOR ROTARY MECHANICAL SEALS

Frank E. Payne, Glencoe, Ill., assignor to Crane Packing Company, Chicago, Ill., a corporation of Illinois Application January 19, 1955, Serial No. 482,769

3 Claims. (Cl. 286—11.14)

The present invention relates to fluid seals and more particularly to a novel form of sealing element designed for use in a rotary mechanical seal of the type shown and described in my copending application Serial No. 307,455, filed September 2, 1952, for Rotary Mechanical Seal, over which the present seal is an improvement.

Briefly, the type of seal with which the present invention is concerned is designed for use in sealing two relatively rotatable parts one of which may be a shaft and the other of which may be a casing in which the shaft rotates. The seal includes a sealing element, commonly known as a washer which is effectively sealed to one of the relatively rotatable parts and has a flat radial sealing surface having running sealing engagement with a radial sealing surface provided on either the other part or on a separate seat carried thereby. The washer is itself sealed to the first member by a static seal including a frusto-conical sealing ring or wedge member which bears at one end against a cylindrical surface provided on the washer and at the other end against a concentric surface provided on the first part or on a separate member, as for example, a retainer shell for the seal assembly carried by the first part. In seals of this type the wedge member above referred to is usually in the form of a cone frustum formed of resilient deformable material having a substantial degree of resistance to compressional forces such as Teflon. The cone frustum has a slant height which is somewhat greater than the radial distance between the two surfaces which it is designed to seal, and thrust means in the form of a spring bears against the frusto-conical sealing member at a location and in such a direction as to wedge the ring into static sealing engagement with the two cylindrical surfaces against which it bears.

It has been found in actual practice with seals of this type, particularly those seals which are subject to high temperatures, for example in the neighborhood of 500° F., fluctuations in temperature cause expansion and contraction of the sealing cone or cones involved due to the inherent coefficient of friction in the material involved so that the efficacy of the sealing action attained at the regions of contact between the sealing ring and the cylindrical surfaces against which it bears is impaired thus resulting in certain instances, in fluid leakage.

The present invention is designed to overcome the above noted limitations that are attendant upon the use of seals of this character, and toward this end it contemplates the provision of an improved rotary mechanical seal of the type briefly outlined above and including a frusto-conical sealing ring or rings which have been formed at at least one base of the cone frustum in such a manner as to render the sealing regions of the ring flexible so that the pressure exerted by the thrust means on the ring or rings will produce a more effective and uniform wedging action whereby the sealing surface or surfaces involved will be caused to have a more intimate contact with the cylindrical surfaces against which they bear thus materially improving the sealing efficiency of these rings.

The invention has been illustrated herein in connection with a well known type of rotary mechanical seal, the seal being of the so-called package-type and including an outer shell or retainer adapted to be installed by a pressed fit in a recess provided for it in one rotatable member. The seal assembly illustrated herein has, purely for exemplary purposes, been shown as being installed in a hydraulic torque converter mechanism where moderate temperature differentials are encountered, but it will be understood of course that the assembly is capable of installation and is equally effective in a large variety of other mechanism having relatively rotatable parts as for example in pump constructions, compressor constructions and the like, as well as in mechanism such as may be employed in industrial chemical plants where considerably higher temperature differentials are experienced.

In the accompanying three sheets of drawings forming a part of this specification, several embodiments of the invention have been shown.

In these drawings:

Fig. 3 is a diagrammatic view illustrating the cross sectional outlines of a sealing member employed in connection with the present invention with the same existing in its free state and in its compressed state in an actual seal installation.

Figs. 4 and 5 are fragmentary sectional views similar to Fig. 1 showing modified forms of the seal assembly.

Fig. 6 is a side elevational view of a spring member employed in connection with the present invention.

Figure 1:
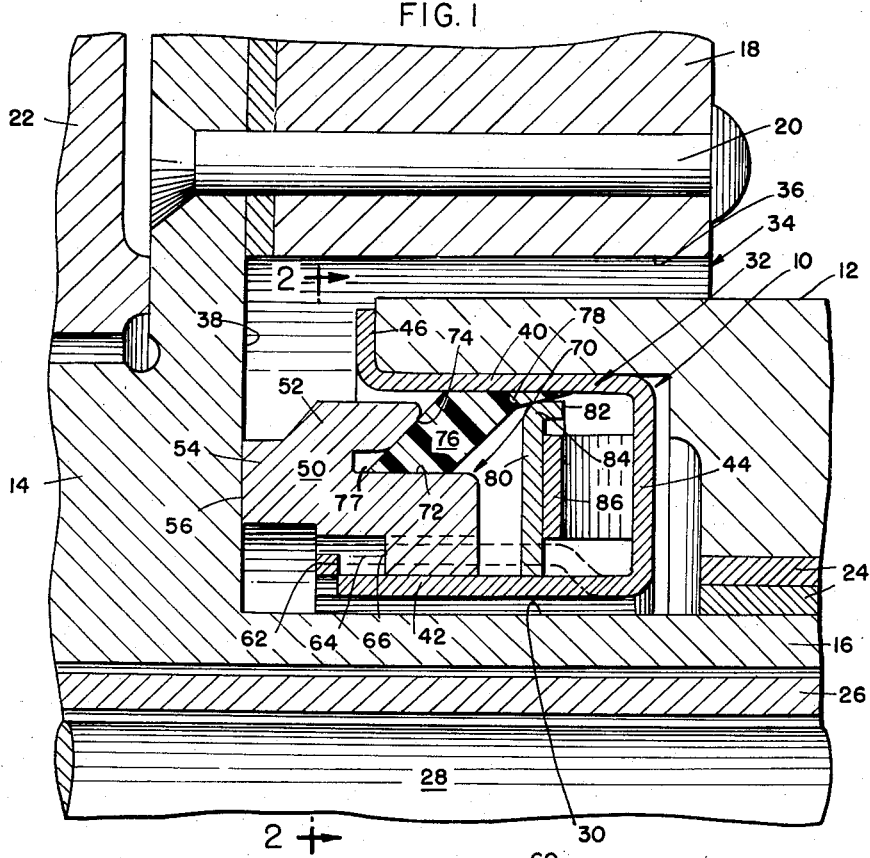
Fig. 1 is a fragmentary sectional view taken substantially centrally through a torque converter installation showing the improved rotary mechanical seal of the present invention applied thereto.

Referring now to the drawings in detail, the seal assembly with which the improved sealing ring is associated is designated in its entirety at 10 and is shown operatively installed in a hydraulic torque converter mechanism in which only such portions of the torque converter assembly as are pertinent to the use of the present seal have been illustrated. Among these are the outer housing 12 of the front oil pump, and the latter being of the meshing gear type; the pump hub 14 which has a sleeve-like extension 16 formed thereon; the torque converter housing 18 to which the hub is secured by means of rivets 20; and a fragment of one of the torque converter vanes 22. The sleeve portion 16 of the hub 14 is rotatably journaled in a sleeve bearing 24 in the gear pump housing 12. A central sleeve 26 operatively connected to the torque converter impeller and transmission drive shaft 28 are incidental disclosures having no particular association in the present seal assembly.

Inasmuch as the gear pump housing 12 is rotatable relative to the pump hub 14, it is necessary to effect a fluid seal between these two parts. Accordingly, the pump casing 12 is provided with an annular recess 30 therein into which there is pressed a retainer element 32 associated with the seal assembly 10. The pump hub 14 is secured to the torque converter housing 18 in such a manner that these two parts cooperate to produce a relatively deep recess 34 having a cylindrical wall 36 and a radial wall 38. The forward end of the pump casing 12 projects into the recess 34 and the seal assembly 10 is contained partially within the recess 30 and partially within the recess 34 between the end of the pump housing 12 and the bottom wall 38 of the recess 34.

The retainer 32 which is of shell-like configuration includes a cylindrical portion 40 which is pressed into the recess 30, an inner cylindrical wall 42, commonly known as a center-post, and an interconnecting end wall 44. The forward end of the retainer is open and is provided with a laterally turned rim or flange portion 46 which serves as a stop to limit the extent of projection of the retainer as a whole into the opening 30. Disposed within the retainer 32 and slidable axially with respect thereto is a sealing washer 50 including a body portion 52 and a forwardly extending nose piece 54 the forward face 56 of which is lapped to a high degree of flatness and is designed for running engagement with the bottom wall 38 of the recess 34, this latter surface being similarly lapped to a high degree of flatness. The washer 50 is telescopically received over the center-post 42 of the retainer and is formed with a plurality of circumferentially spaced longitudinally extending grooves 58 (Fig. 2) on the inner face thereof and into which there extends a plurality of longitudinal ribs 60 provided on the center-post 42. The interlocking ribs and grooves just mentioned constitute a driving means whereby the washer may be driven from the pump housing 12 through the retainer shell 32.

The forward rim of the center-post 42 is provided with a series of circumferentially spaced outwardly staked ribs 62, the ribs being disposed intermediate the adjacent longitudinal ribs 60 and the washer 50 being formed with a series of relatively short clearance grooves 64 into which the ribs 62 extend. The ribs 62 are positioned in the path of movement of the end wall 66 of the various clearance grooves 64 so that the washer is prevented from being slid forwardly from the end of the center-post 42. While any number of ribs 60, 62 and grooves 58, 64 may be employed, the seal disclosed utilizes four interlocking and driving ribs arranged 90° apart and four similarly spaced locking ribs and grooves similarly spaced and circumferentially offset 45° from the former ribs and grooves.

The washer 50 is formed with a circular recess 70 in its rear face presenting a cylindrical wall 72 and a conical wall 74. The bottom of the recess 70 is provided with an annular trough portion 77 immediately surrounding the cylindrical wall 72. In order to seal the washer 50 to the retainer shell 32 and prevent passage of fluid around the rear side of the washer, a sealing ring 76 generally in the form of a cone frustum and which is preferably formed of a material that is relatively incompressible, as for example "Teflon," extends between the surface 72 and the cylindrical wall 40 of the retainer. At the large base of the cone frustum and on the rear side thereof the sealing ring 76 is formed with a tapered lip 78, the nature and function of which will be set forth subsequently. A thrust washer 80 having a rearwardly and laterally turned periphery 82 is provided with a curved surface 84 which bears forwardly and upwardly against a medial region of the tapered lip 78. A circular leaf spring 86 (see also Fig. 6) is disposed between the rear wall 44 of the retainer and the thrust washer 80 and normally urges the latter forwardly into engagement with the tapered lip 78 of the sealing ring 76.

The slant height of the frusto-conical sealing ring 76 is somewhat greater than the radial distance between the surfaces 72 and 40 so that the forward pressure exerted by the thrust washer 80 against the sealing ring 76 as a whole will cause a wedging action of the sealing ring to obtain whereby the body of the frusto-conical ring 76 tends to straighten out in radial fashion but is prevented from doing so by the space limitations provided for it. In this manner a strong wedging action is attained so that an effective seal normally occurs both at the inner and outer peripheries of the frusto-conical sealing ring 76.

It has been stated above that the material from which the sealing cone 76 is formed is relatively incompressible. The term "incompressible" as employed above, refers to the inability of the material of the ring to decrease in overall volume when subjected to a compressional force. In other words, the material lacks compressibility in the sense that a sponge possesses it. One material which fulfills the requirements of the present seal is a polytetrafluoroethylene polymer which is manufactured and sold by E. I. du Pont de Nemours and Company under the trade name "Teflon." This material is characterized by its chemical inertness ranging from extremely low temperatures up to 572° F. In this range the material resists the attack of corrosive reagents and solvents. Physically, molded Teflon is a white to gray solid which feels slippery to the touch. The material is practically incompressible but it is subject to a small amount of deformation or cold flow with such deformation taking place in direct proportion to some mathematical power of the applied deforming force. Upon release of the compressive force the material tends to resume its original dimensions.

Figure 2:
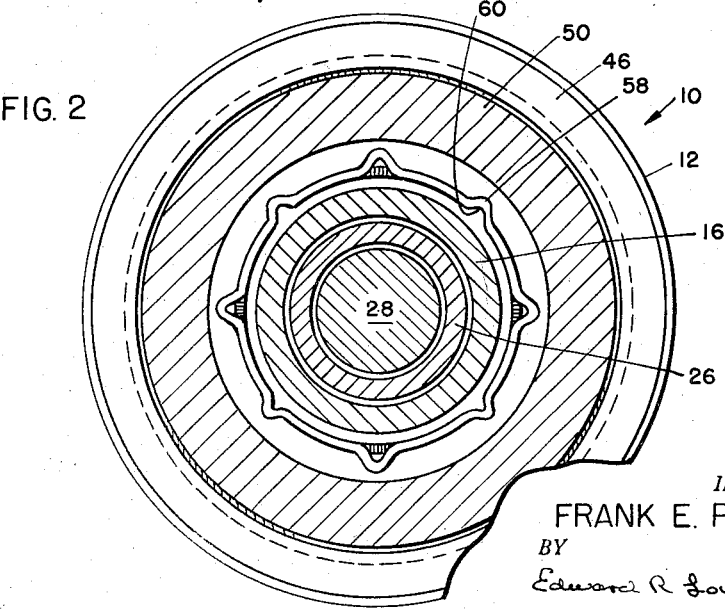
Fig. 2 is a sectional view taken substantially along the line 2—2 of Fig. 1.

Referring now to Figs. 1 to 3 inclusive, the frusto-conical ring 76 is convex as viewed from the left hand side of Fig. 1 and the forward apex thereof seats on the cylindrical surface 72 within the groove 77. The slant angle of the outside conical surface of the sealing ring is substantially equal to the slant angle of the conical bottom wall so that the opposed surfaces between these two parts will engage each other to produce an extremely effective sealing action at the regions which are involved.

In connection with seals of the same general type described herein but in which the tapered sealing lip 78 has been omitted from the rear edge of the large base of the cone frustum, it has been found in actual practice that under the influence of extreme temperature differentials there will be a tendency for the outer periphery of the ring 76 to separate or move away from the cylindrical wall 40 with which it is in contact. This separation in certain instances will be complete around the periphery of the sealing ring or it may be partial, as for example where small increments of the periphery move away from the cylindrical surface. In order to obviate these difficulties, the tapered lip portion 78 has been formed on the sealing ring 76 and is preferably a result of the machining operations conducted upon initial formation of the ring 76. The ring 76 in its free state assumes the cross sectional outlines indicated in dotted lines in Fig. 3 wherein the slant angle of the sealing ring 76 is very slightly more obtuse than is the slant angle of the ring when it is actually installed in the seal assembly. When so installed, the ring is compressed under the influence of the spring 86. The tapered lip 78 as shown in Fig. 3 lies almost wholly outside the cylindrical confines of the line $a$—$a$ which represents the inside surface of the cylindrical wall 40 of the retainer shell 32. However, when the sealing ring 76 is installed within the retainer shell 32, the lip 78 assumes the full line position shown in Fig. 3 wherein it tends to hug the cylindrical wall 40 by virtue of the inherent resiliency of the Teflon material 76. The lip 78 thus forms an effective seal against the cylindrical wall 40 and this seal is enhanced by the camming and wedging action of the thrust washer 80 acting under the influence of the leaf spring 86. Any shrinkage, either radial or along the slant height of the cone frustum, is compensated for by the forces that are inherent in or are applied to the tapered lip 78 tending to force the same into coextensive contact with the inner face of the cylindrical wall 40.

In Fig. 4 a somewhat modified form of sealing ring is shown operatively associated with a seal assembly of the type shown in Figs. 1 and 2. To avoid needless repetition of description similar reference numerals of a higher order have been employed to designate the corresponding parts of the two illustrated forms of the invention. In this latter form of the invention the retainer 132 remains substantially the same as the retainer 32 in the form of the invention shown in Fig. 1 while the washer 150 is similar to the washer 50 but the annular groove 77 in the bottom wall of the recess 170 has been omitted so that the forward rim 171 of the frusto-conical sealing ring 176 seats at the juncture between the wall 174 and the cylindrical wall 172 of the recess 170. The slant angle of the bottom wall 174 of the recess 170 is slightly greater than the slant angle of the forward or outside surface of the sealing ring 176 so that as the sealing ring is urged forwardly with increasing degrees of pressure, a progressive face-to-face sealing action between these two opposed convex and concave surfaces respectively will be attained.

The sealing ring 176 is machined so as to have an annular channel 177 in the rear face thereof near its outer periphery thus defining a relatively thin and flexible lip 178 which corresponds in function to the lip 78 in the other form of the invention. The lip is expanded outwardly against the inner cylindrical surface of the wall 140 of the retainer 132 by means of a plurality of split expansion rings 179 of which three have been shown in the present instance, the rings being disposed within the channel 177. The thrust washer 180 is provided with a circular flange 181 which extends radially beyond the inner periphery of the outermost expansion ring 179 so as to retain the various rings within the channel 177.

In Fig. 5 another modified form of the invention has been shown and again, in order to avoid needless repetition of description, reference numerals of a second higher order have been employed to designate the parts of the seal assembly which correspond to those shown in Fig. 1. In this form of the invention the retainer 232, washer 250 and spring 286 remain substantially unchanged but the recess 270 is designed to receive therein two nested frusto-conical sealing elements 276 each of which is similar to the sealing ring 176 and which has its flexible sealing lip 278 normally urged outwardly by a single split expansion ring 279. The forward surface of the rearmost sealing ring 276 serves to retain the compression ring 279 in the channel 277 of the foremost sealing ring 276 while the thrust member 280 has a frusto-conical portion 281 designed to bridge the open end of the channel 277 in the rearmost ring 276 to maintain the compression ring 279 in position.

Figure 7:
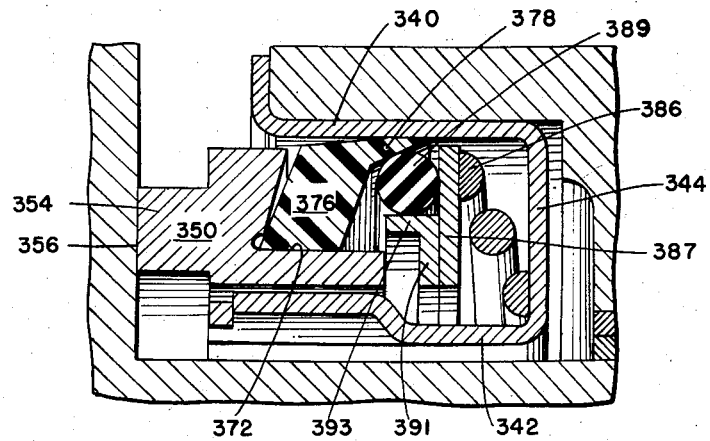
Figs. 7 and 8 are fragmentary sectional views similar to Figs. 4 and 5 showing additional modified forms of the seal assembly.

Still another modified form of the invention is shown in Fig. 7. Again utilizing reference numerals of a still higher order to designate corresponding parts, the retainer 332, washer 350 and sealing ring 376 remain substantially the same as these corresponding parts in Fig. 1 but in place of the thrust member 80 and spring 86, an O ring and thrust plate combination has been employed in combination with a spring of the helical coiled type. The spring 386 bears against a thrust member 387 and the member 387 in turn bears forwardly against an O ring 389 which may be formed of rubber or a rubber substitute. The O ring 389 is adapted to bear forwardly and outwardly against the flexible tapered lip 378 provided on the frusto-conical ring 376. A supporting ring 391 having a cylindrical shelf portion 393 is positioned forwardly of the thrust plate 387 and may, if desired, be secured thereto in any suitable manner, as for example by welding. From the above description it will be seen that forward thrust of the spring 386 acting through the thrust member 387 and thrust plate 391 will serve to wedge the O ring against the tapered lip 378 thus enhancing its sealing effect on the inner cylindrical surface of the retainer wall 340. The resilience of the O ring 389 will permit the same to be flattened somewhat when higher pressures are developed so as to increase the area of effective sealing contact between the lip 378 and the cylindrical surface against which it bears.

Figure 8:
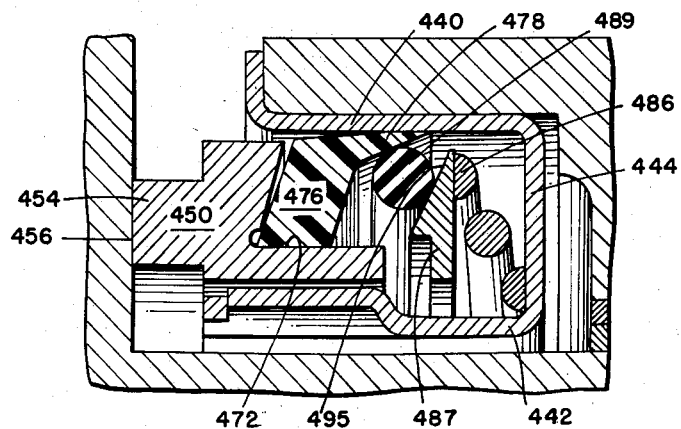

In Fig. 8, an arrangement similar to that shown in Fig. 7 has been employed. Utilizing similar reference characters of a higher order, the parts remain substantially as shown in Fig. 7 but in place of the thrust member 387 with its support 391, 393, a thrust member 487 is employed having a forwardly and upwardly inclined thrust surface 495 which serves the dual function of supporting the O ring 489 as well as exerting a forward pressure thereon whereby the O ring is wedged into engagement with the flexible lip 478 of the sealing ring 476.

In compliance with Title 35, U. S. Code, Section 112, a preferred form of the invention has been shown in the drawings and will be described herein, but it should be understood that the invention is not limited to the specific disclosure made, and that the appended claims should be construed as broadly as the prior art will permit.

What I claim and desire to secure by Letters Patent is:

1. In combination, a seal retainer having an inner substantially cylindrical surface, a sealing washer having an outer substantially cylindrical surface disposed radially inwardly from the retainer cylindrical surface, a frusto-conical ring disposed between the two substantially cylindrical surfaces to effect a seal therebetween, an abutment on the washer to limit relative axial movement between the ring and washer, a lip on the ring contacting said inner substantially cylindrical surface, said lip being disposed on the side of the ring remote from the abutment and having a tapered inner surface, and means exerting an axial force on the tapered surface to urge the ring against the abutment and to develop a radial component urging the lip against the inner cylindrical surface.

2. The combination described in claim 1, said abutment being disposed at a region of the ring spaced from the cylindrical surfaces.

3. The combination described in claim 1, said abutment acting upon a conical surface of the ring to produce a radial component of force tending to urge the ring against the outer substantially cylindrical surface.

References Cited in the file of this patent

UNITED STATES PATENTS

| | | |
|---|---|---|
| 1,273,736 | Christenson | July 23, 1918 |
| 2,316,941 | Dodge | Apr. 20, 1943 |
| 2,415,888 | Joy | Feb. 18, 1947 |
| 2,760,794 | Hartranft | Aug. 28, 1956 |

FOREIGN PATENTS

| | | |
|---|---|---|
| 596,089 | Germany | May 3, 1934 |